US012705688B2

(12) United States Patent
Jung et al.

(10) Patent No.: US 12,705,688 B2
(45) Date of Patent: Aug. 11, 2026

(54) APPARATUS AND METHOD WITH IMAGE PROCESSING FOR SPARSE DUAL-PIXEL IMAGE DATA

(71) Applicant: Samsung Electronics Co., Ltd., Suwon-si (KR)

(72) Inventors: Sangil Jung, Yongin-si (KR); Seungin Park, Yongin-si (KR); Jaehyoung Yoo, Seongnam-si (KR); Solae Lee, Suwon-si (KR); Byung In Yoo, Seoul (KR); Hana Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 688 days.

(21) Appl. No.: 17/981,961

(22) Filed: Nov. 7, 2022

(65) Prior Publication Data

US 2023/0245267 A1 Aug. 3, 2023

(30) Foreign Application Priority Data

Jan. 28, 2022 (KR) ........................ 10-2022-0013529

(51) Int. Cl.
*G06T 3/4007* (2024.01)
*G06T 5/50* (2006.01)
(Continued)

(52) U.S. Cl.
CPC .............. *G06T 3/4007* (2013.01); *G06T 5/50* (2013.01); *G06T 2207/20076* (2013.01); *G06T 2207/20228* (2013.01)

(58) Field of Classification Search
CPC ..................... G06T 3/4007; G06T 5/50; G06T 2207/20076; G06T 2207/20228
See application file for complete search history.

(56) References Cited

U.S. PATENT DOCUMENTS 6,097,855 A * 8/2000 Levien .................... G06T 3/608 382/296
10,805,594 B2 10/2020 Bikumandla et al.
(Continued)

FOREIGN PATENT DOCUMENTS

JP 2014-228671 A 12/2014
JP 2016-9043 A 1/2016
(Continued)

OTHER PUBLICATIONS

Jang, Jinbeum, et al. "Depth map generation using a single image sensor with phase masks." Optics express 24.12 (2016): 12868-12878.*

(Continued)

*Primary Examiner* — Oneal R Mistry
*Assistant Examiner* — Nhut Huy Pham
(74) *Attorney, Agent, or Firm* — NSIP Law

(57) ABSTRACT

An apparatus and method with image processing for sparse dual-pixel image data are included. In one general aspect, an apparatus includes a processor configured to generate a first interpolated image by performing interpolation on a first image and generate a second interpolated image by performing interpolation on a second image, wherein the first image and the second image comprise pixel values obtained by dual-pixels of an image sensor, and generate a disparity map based on the first interpolated image and the second interpolated image.

30 Claims, 11 Drawing Sheets

(51) Int. Cl.
*H04N 13/00* (2018.01)
*H04N 23/67* (2023.01)

(56) References Cited

U.S. PATENT DOCUMENTS

| | | | | |
|---|---|---|---|---|
| 2017/0011525 | A1* | 1/2017 | Kim | G06V 20/52 |
| 2018/0152648 | A1 | 5/2018 | Tang | |

FOREIGN PATENT DOCUMENTS

| | | | |
|---|---|---|---|
| JP | 6857341 | B2 | 3/2021 |
| KR | 10-2015-0048716 | A | 5/2015 |
| KR | 10-2018-0056754 | A | 5/2018 |
| KR | 10-2019-0081591 | A | 7/2019 |
| KR | 10-2020-0037698 | A | 4/2020 |
| KR | 10-2020-0049152 | A | 5/2020 |
| KR | 10-2020-0108735 | A | 9/2020 |
| KR | 10-2022-0013882 | A | 2/2022 |

OTHER PUBLICATIONS

Canon (“EOS 5D Mark IV Technical Specifications”, https://cvp.com/pdf/eos-5d-mark-iv_sales_sheet--00 -.pdf, published Nov. 29, 2016) (Year: 2016).*

Jang et al. (Jang, Jinbeum, et al. “Depth map generation using a single image sensor with phase masks.” Optics express, published Jun. 3, 2016) (Year: 2016).*

Canon (EOS 5D Mark IV Technical Specifications, https://cvp.com/pdffeos-5d-mark-iv_sales_sheet--002-.pdf, published Nov. 29, 2016) (Year: 2016).*

Cambridge in Color (Understanding Digital Image Interpolation, www.cambridgeincolour.com, published Nov. 5, 2005) (Year: 2005).*

Jang, Jinbeum, et al. “Depth map generation using a single image sensor with phase masks.” Optics express (Year: 2016).*

Cambridge in Color (“Understanding Digital Image Interpolation”, www.cambridgeincolour.com (Year: 2005).*

Jang, Jinbeum, et al. “Depth map generation using a single image sensor with phase masks.” Optics express Dec. 24, 2016, (11 pages).

Punnappurath, Abhijith, et al. “Modeling Defocus-Disparity in Dual-Pixel Sensors.” 2020 IEEE International Conference on Computational Photography (ICCP). IEEE, 2020., (12 pages).

Korean Office Action issued on Apr. 29, 2024, in counterpart Korean Patent Application No. 10-2022-0013529 (2 pages in English, 6 pages in Korean).

BOLG: Canon Dual-Pixel AF Features in Camera Museum http://image-sensors-world.blogspot.com/2013/08/canon-dual-pixel-af-features-in-camera.html. (Aug. 26, 2013).

BLOG: Improvements to Portrait Mode on the Google Pixel 4 and Pixel 4 XL. https://ai.googleblog.com/2019/12/improvements-to-portrait-mode-on-google.html (Dec. 16, 2019).

* cited by examiner

APPARATUS AND METHOD WITH IMAGE PROCESSING FOR SPARSE DUAL-PIXEL IMAGE DATA

CROSS-REFERENCE TO RELATED APPLICATIONS

This application claims the benefit under 35 USC § 119(a) of Korean Patent Application No. 10-2022-0013529, filed on Jan. 28, 2022, in the Korean Intellectual Property Office, the entire disclosure of which is incorporated herein by reference for all purposes.

BACKGROUND

1. Field

The following description relates to an apparatus and method with image processing for sparse dual-pixel image data.

2. Description of Related Art

An autofocus method based on image data from a dual-pixel image sensor may be used for capturing an image using a camera. Among various autofocus methods, a method referred to as phase-difference auto-focus (PDAF) has been widely used.

The PDAF method uses a sensor with pixels dedicated to detecting pixel-level phase differences. With the PDAF method, increasing the number of dedicated pixels in a sensor may be advantageous for auto-focusing, however, an increase in pixels dedicated to detecting phase differences may cause image quality degradation.

A dual-pixel sensor is a sensor where each pixel may be used for both image capture and phase-difference detection. In a dual-pixel sensor, each pixel includes two photodiodes. By configuring a sensor to have all (or, many) of its pixels configured as dual-pixels, PDAF may be performed while reducing image quality degradation.

Disparity information (e.g., a disparity map) may be detected from left and right images obtained by the two photodiodes in respective pixels. Since the disparity information of a scene can be readily used to derive depth information (e.g., a depth map) of the scene, which is useful for autofocusing. That is, the dual-pixel method may support an autofocus function, as well as other techniques or applications that may use depth information. A disparity between left and right images may be obtained by stereo matching algorithms.

In contrast to a dual-pixel sensor (or, 2 photodiode (2PD) sensor), a super photodiode (PD) sensor has only some pixels configured as dual-pixels (e.g., 1 in 16 or 1 in 32). A super PD sensor that includes more typical pixels (i.e., non-dual pixels, e.g., ordinary color pixels, IR pixels, monochrome pixels, etc.) may have better image quality than a super PD sensor with fewer typical pixels, however, a super PD sensor may produce lower quality disparity information than a 2PD sensor since the number of dual-pixels is less than that of a 2PD sensor.

The principle of disparity between a left and right image may correspond to differences in point spread functions (PSF) of the left and right images, whereas a blur area may occur when an object is not within the focal plane (or focal range). Since a super PD sensor may include sparsely distributed dual-pixels capturing the area of blur, disparity quality for the blur area may be less than the disparity quality that would be provided by a 2PD sensor (which includes densely distributed dual-pixels). Accordingly, the quality of an estimated disparity map (and a related function such as auto-focus) may vary depending on how the sparsely distributed dual-pixels are used to generate left and right images (i.e., a dual-image). For example, a conventional method to generate a dual-image for a super PD sensor may involve reordering values of pixels. However, using this technique, the resolution of disparity information may be degraded or the accuracy of disparity estimation may be deteriorated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes a processor configured to generate a first interpolated image by performing interpolation on a first image and generate a second interpolated image by performing interpolation on a second image, wherein the first image and the second image comprise pixel values obtained by dual-pixels of an image sensor, and generate a disparity map based on the first interpolated image and the second interpolated image.

The first image may be a left image, and the second image may be a right image.

The processor may be further configured to generate the first interpolated image based on a position of a first dual-pixel of the dual-pixels, a first pixel value obtained by the first dual-pixel, a position of a second dual-pixel of the dual-pixels, and a second pixel value obtained by the second dual-pixel.

The processor may be configured to generate the second interpolated image based on the position of the first dual-pixel, a third pixel value obtained by the first dual-pixel, the position of the second dual-pixel, and a fourth pixel value obtained by the second dual-pixel.

Each of the dual-pixels respectively may include a first photodiode, a second photodiode, and a single lens configured to refract light to the first photodiode and the second photodiode.

The first pixel value may be obtained by the first photodiode of the first dual-pixel, the second pixel value may be obtained by the first photodiode of the second dual-pixel, the third pixel value may be obtained by the second photodiode of the first dual-pixel, and the fourth pixel value may be obtained by the second photodiode of the second dual-pixel.

The apparatus may include the image sensor.

The processor may be further configured to generate an interpolation pixel at an intermediate position between the position of the first dual-pixel and the position of the second dual-pixel.

The processor may be further configured to determine an average of the first pixel value and the second pixel value and to set a pixel value of the interpolation pixel to the average.

The processor may include an adder configured to perform addition of the first pixel value and the second pixel value, and a shifter configured to perform a division operation by performing a bit-shift operation on a result of the addition that may be outputted from the adder.

The processor may be further configured to perform interpolation such that a ratio of a number of interpolation pixels in a horizontal direction to a number of interpolation pixels in a vertical direction may be the same as, or a multiple of, a ratio of a number of pixels in a horizontal direction of the image sensor to a number of pixels in a vertical direction of the image sensor.

The apparatus may include a smartphone.

In one general aspect, a processor-implemented method may include accessing a first image and a second image, the first image and the second image generated by an image sensor including pixels that include dual-pixels and that include pixels that may be not dual-pixels, wherein each dual-pixel respectively may include a first photodiode, a second photodiode, and a single lens, wherein the first image may include pixel values obtained from the first photodiodes and wherein the second image may include pixel values obtained from the second photodiodes, generating a first interpolated image by generating first interpolated pixels based on interpolation of the pixel values in the first image, and generating a second interpolated image by generating second interpolated pixels based on interpolation of the pixel values in the second image, and generating a disparity map based on the first interpolated image and the second interpolated image.

The first image may be a left image, and the second image may be a right image, and wherein the first image and the second image may be captured by the image sensor at the same time.

The first interpolated pixels may be positioned in the first interpolated image based on positions of respective pairs of pixels in the first image, and wherein the second interpolated pixels may be positioned in the second interpolated image based on positions of respective pairs of pixels in the second image.

The pairs of pixels may correspond to pairs of the dual-pixels of the image sensor.

Each pixel of the first interpolated image may have a position therein that corresponds to a position between the pixels of a corresponding pair of pixels of the first image.

The first interpolated pixels comprise respective averages of the pixel values in the first image.

The generating of the first and second interpolated pixels may include performing, by an adder, additions of the pixel values in the first image and additions of the pixel values in the second image, and performing, by a shifter, bit-shift operations on results of the additions outputted from the adder.

The generating of the first interpolated image and the second interpolated image may include performing interpolation such that a number of pixels in a horizontal direction in each of the first image and the second image may be the same as a number of pixels in a horizontal direction in each of the first image and the second image.

The generating of the first interpolated image and the second interpolated image may include performing interpolation such that an image aspect ratio of each of the first image and the second image may be the same as, or a multiple of, an image aspect ratio of the image sensor.

In one general aspect, a method may include accessing a first image comprising first pixels, wherein each first pixel may include a first value, wherein the first image may be generated by an image sensor comprising pixels, wherein the pixels of the image sensor comprise dual-pixels and non-dual-pixels, each dual-pixel respectively including first and second photodiodes, wherein the first values may be provided by the respective first photodiodes, and generating a first interpolated image by interpolating pairs of the first pixels.

Each first photodiode may have a different point spread function than its corresponding second photodiode.

The first photodiodes may be left photodiodes and the second photodiodes may be right photodiodes.

Each dual-pixel further may include a lens configured to refract light to the corresponding first and second photodiodes.

A smartphone may include the camera, wherein the camera may include the image sensor, and wherein the camera may be auto-focused based on the disparity map.

The non-dual-pixels may sense a color and the first and second images may include color pixels having color values provided by color sensing of the non-dual-pixels.

In one general aspect, a non-transitory computer-readable storage medium storing instructions that, when executed by a processor, cause the processor to perform any of the methods.

Other features and aspects will be apparent from the following detailed description, the drawings, and the claims.

Figure 1:
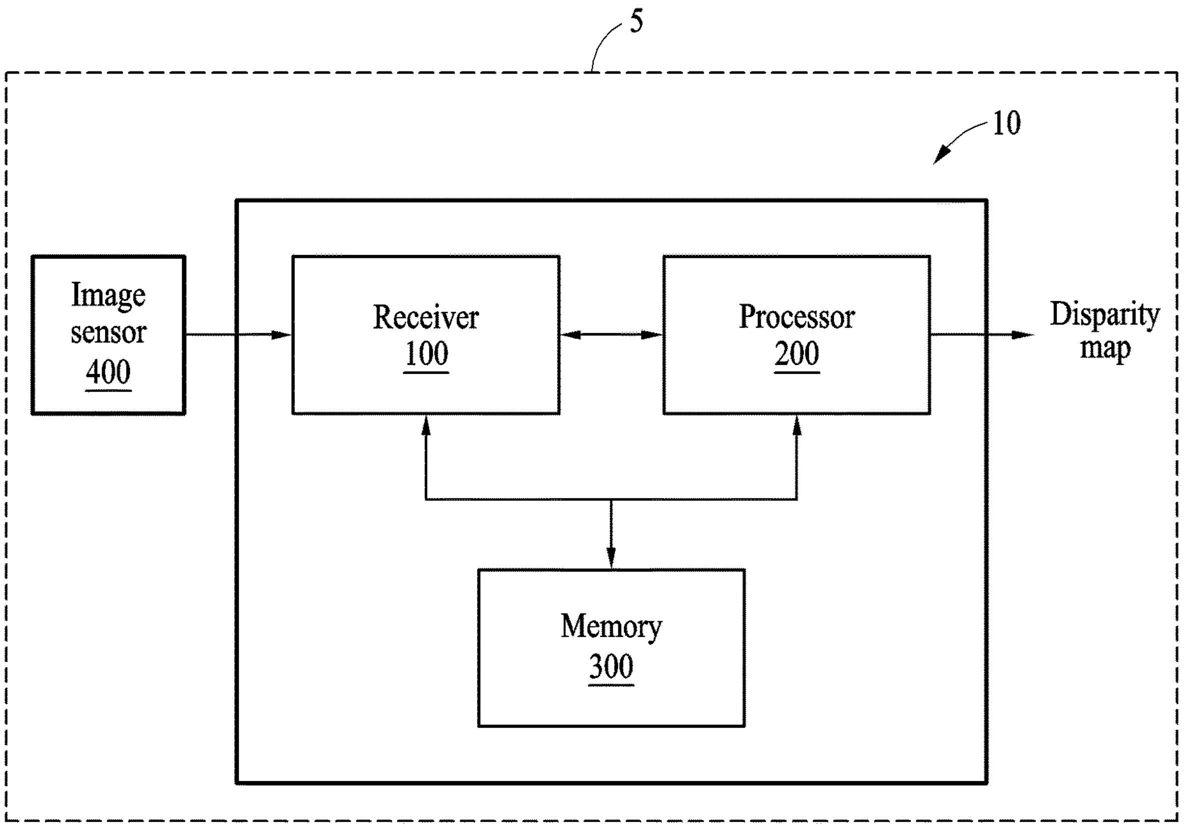
FIG. 1 illustrates an example of an image processing apparatus, according to one or more embodiments.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein.

However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

FIG. 1 illustrates an example of an image processing apparatus, according to one or more embodiments. Referring to FIG. 1, an image processing apparatus 10 may process an image. The image may be an image of an object or scene formed by sensing the refraction or reflection of light, and may represent the shape of an object or scene using lines, colors, etc. For example, the image may be in a digital form typically processed by a computer (e.g., a matrix of pixel values). In an example, the image processing apparatus 10 may be included in an electronic device 5. In an example, the image processing apparatus may itself be an electronic device, e.g., with the image sensor 400 being a component of the electronic device 5 or separate from the electronic device 5.

The image processing apparatus 10 may process an image obtained by an image sensor 400 configured with a plurality of pixels (as used herein, depending on the context, the term "pixel" may refer to an individual point sensor in an image sensor or an element of an image). Among the plurality of sensor pixels, some pixels (e.g., 1 in 16, 1 in 32, etc.) are implemented as dual-pixels, and other sensor pixels are ordinary non-dual pixels (e.g., color-sensing pixels). For example, the image sensor 400 may be a super photodiode (PD) image sensor. In some implementations, the dual-pixels of a super PD image sensor may be somewhat evenly distributed among the pixels of the super PD image sensor. In some implementations, the dual-pixels of a super PD image sensor may provide a left and right value (raw disparity data) but may not provide color data, and a color image produced by a super PD image sensor may have "empty" pixels at locations corresponding to the dual-pixels. An empty pixel may be colored based on colors of neighboring pixels.

The image processing apparatus 10 may be implemented in various electronic devices 5 using a super PD type of image sensor. For example, the electronic device 5 or the image processing apparatus 10 may be, or may be included in, a personal computer (PC), a data server, or a portable device. The portable device may be a laptop computer, a mobile phone, a smartphone, a tablet PC, a mobile internet device (MID), a personal digital assistant (PDA), an enterprise digital assistant (EDA), a digital still camera, a digital video camera, a portable multimedia player (PMP), a personal navigation device or portable navigation device (PND), a handheld game console, an e-book, a smart device, an on-board computing system of a vehicle, an advanced driver-assist system/autonomous-driving (ADAS/AD) system, or the like. The smart device may be a smart watch, a smart band, a smart ring, or the like.

The image processing apparatus 10 may generate a disparity map by processing an image. The disparity map may be helpful for a variety of applications, for example, image processing (e.g., de-blurring), object detection/recognition, auto-focusing, etc. As noted, a dual-pixel of the image sensor 400 may include two photodiodes (e.g., left and right, up and down, upper-left and lower-right, etc.) under a single microlens that refracts light to the two photodiodes. Due to different angles of incidence on the microlens, the two photodiodes of a dual-pixel may have different point spread functions (PSFs). That is, a left photodiode and a right photodiode may have different respective PSFs corresponding to their different microlens incidence angles. When blur has occurred in an area of an image due the focal depth of the area being out of the focal range of the camera when the image was captured, corresponding disparity may occur due to a difference between the PSFs. Through processing described below, this disparity may be conveniently represented in the form of a disparity map, which may be an image representing the disparity (i.e., an image whose pixels are disparity values). Examples of disparity maps are described in detail with reference to FIGS. 8 and 9.

The image processing apparatus 10 may generate a disparity map by using interpolation on a left image and a right image obtained by the image sensor 400. The terms “left” and “right” are used herein to discuss relative arrangement with respect to stereo pairing and do not imply any particular orientation of an image, a pixel, an image sensor, or the like. In some examples, the left image may be an image from the image sensor 400 that includes the values of the left photodiodes of the dual-pixels and the right image may be an image from the image sensor 400 that includes the values of the right photodiodes of the dual-pixels (where the left and right images are captured concurrently by the image sensor 400). In other examples, the left and right images may be images of only the left dual-pixel values and the right dual-pixel values, respectively. Regardless of the form of the left and right images (which at the least contain dual-pixel values), the left and right images comprise data sensed at the same time by the image sensor 400. That is, the left and right images are images of a same scene/object captured at a same time.

The image processing apparatus 10 may include a receiver 100 and a processor 200. The image processing apparatus 10 may further include a memory 300.

The receiver 100 may receive an image, for example a dual-image, from the image sensor 400. The receiver 100 may receive a first image and a second image from the image sensor 400. The first image may be the left image, and the second image may be the right image.

The receiver 100 may include a receiving interface. The receiver 100 may output the received first image and the received second image to the processor 200.

The processor 200 may process data stored in the memory 300. The data for the processor 200 may include computer-executable instructions, source code, bytecode, intermediate code, instructions triggered by the processor 200, etc.

The processor 200 may be a data processing device implemented by hardware including a circuit having a physical structure configured to perform desired operations. For example, the desired operations may be represented as code or instructions in a program.

For example, the hardware-implemented data processing device may be a microprocessor, a central processing unit (CPU), a processor core, a multi-core processor, a multiprocessor, an application-specific integrated circuit (ASIC), a field-programmable gate array (FPGA), a digital signal processor, an image processor, or the like.

The processor 200 may generate a first interpolated image and a second interpolated image by performing interpolation on the first image and the second image, respectively, based on pixel values obtained by the dual-pixels.

Figure 2A:
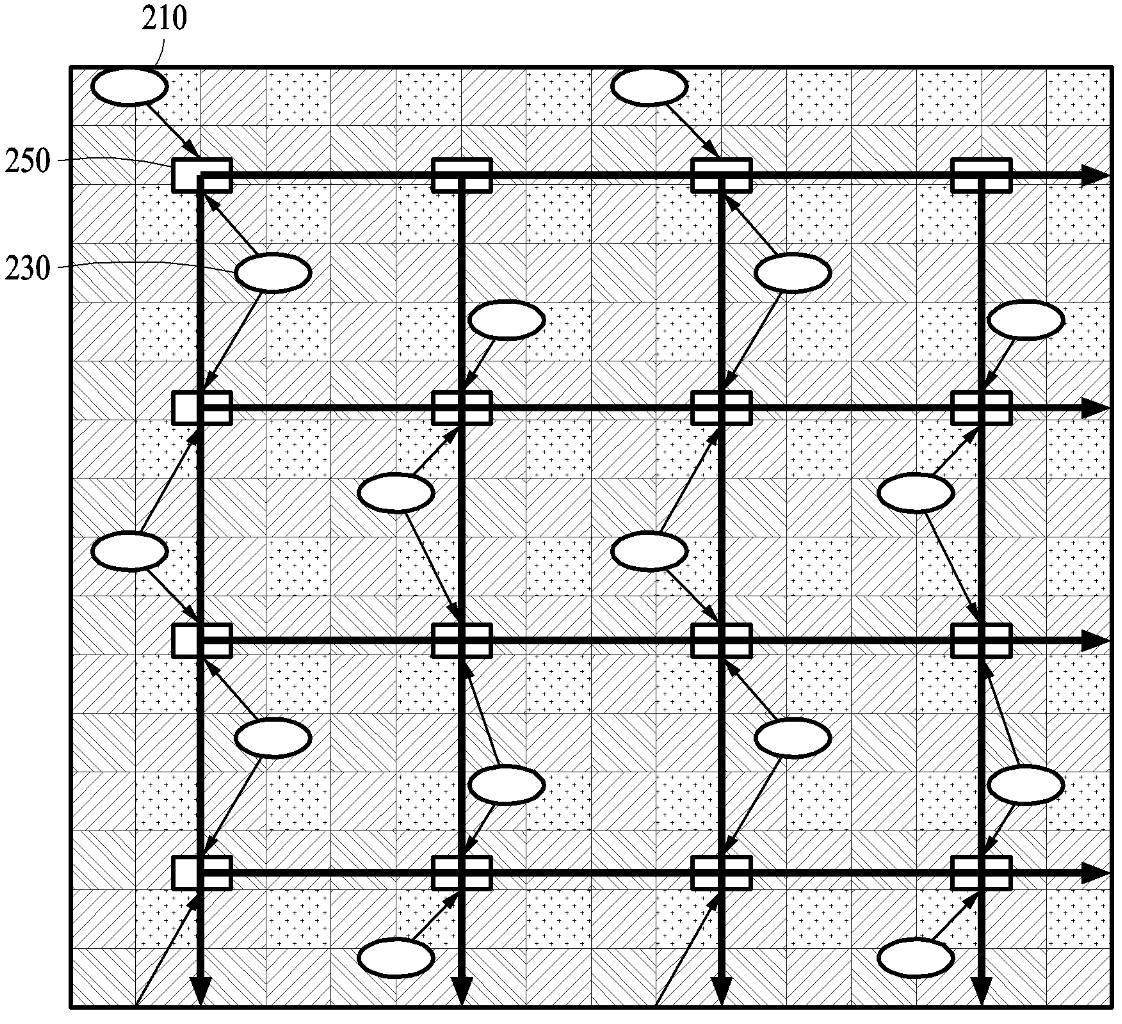
FIG. 2A illustrates an example of an interpolation operation performed by image processing, according to one or more embodiments.
Figure 3A:
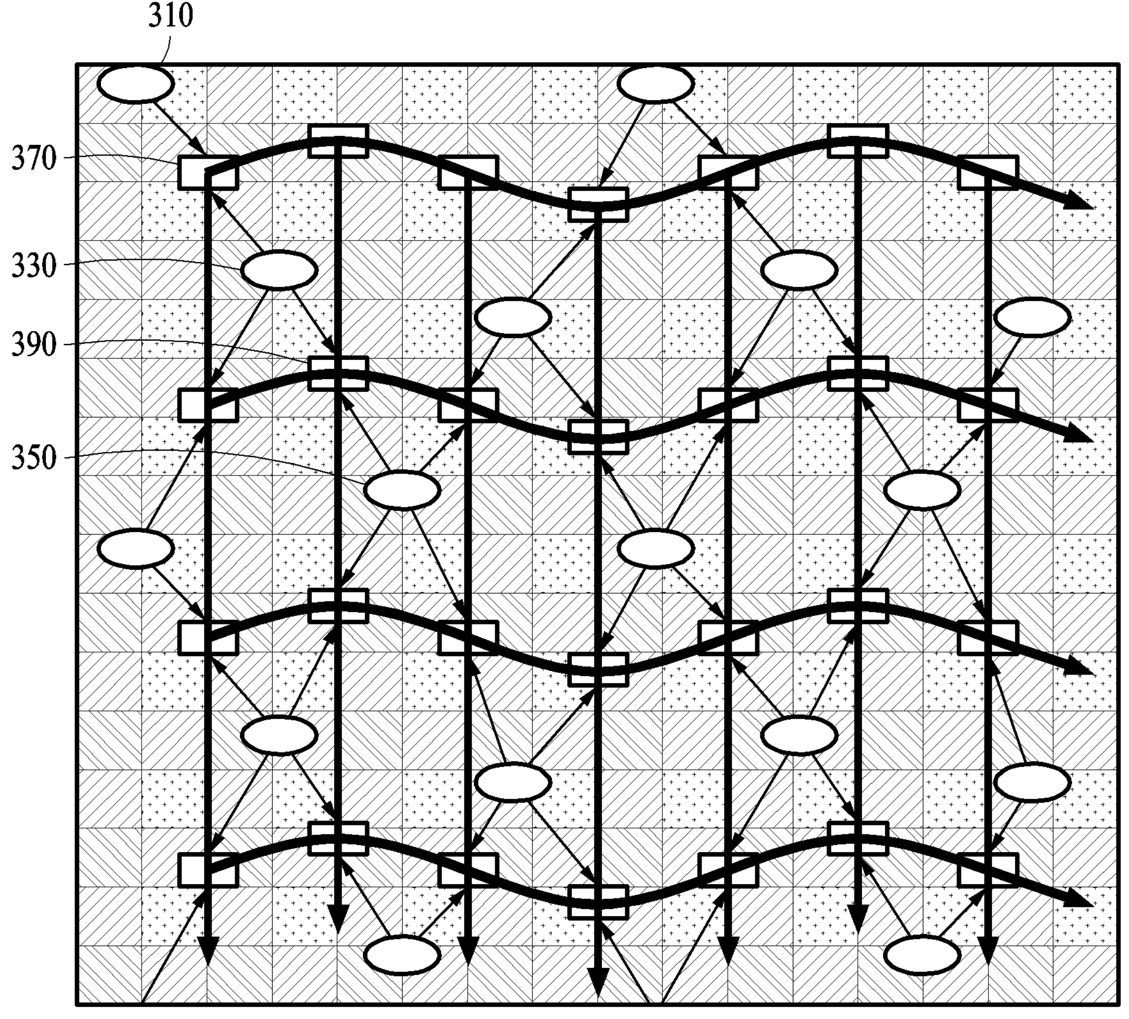
FIG. 3A illustrates another example of an interpolation operation performed by an image processing apparatus, according to one or more embodiments.

The processor 200 may generate the first interpolated image by interpolating pixels of the first image and may generate the second interpolated image by interpolating pixels of the second image. The first and second interpolated images may include interpolation pixels. The interpolation pixels may be generated using a same interpolation technique for the first image and for the second image. The first interpolated image may include first interpolation pixels interpolated from the first image, and the second interpolated image may include second interpolation pixels interpolated from the second image. An interpolation pixel for the first interpolated image may be generated based on (i) a position corresponding to a position of a first dual-pixel included in a plurality of pixels of the image sensor 400, (ii) a first pixel value obtained by the left photodiode of the first dual-pixel, (iii) a position corresponding to a position of a second dual-pixel included in the plurality of pixels of the image sensor 400, and (iv) a second pixel value obtained by the left photodiode of the second dual-pixel. Similarly, an interpolated pixel for the second interpolated image may be generated based on (i) a position corresponding to the position of the first dual-pixel, (ii) a first pixel value obtained by the right photodiode of the first dual-pixel, (iii) a position corresponding to the position of the second dual-pixel, and (iv) a second pixel value obtained by the right photodiode of the second dual-pixel. The positions corresponding to the dual-pixel locations may be positions in the first and second images, for example. As described below, an interpolated image (first or second) may include interpolation pixels generated from respective pairs of many (or all) values/locations obtained by corresponding neighboring pairs of dual-pixels. In other words, the first and second pixels and the locations noted above represent arbitrary pairs of neighboring positions and values for which respective interpolation pixels may be generated. Note that “neighboring” as used herein does not imply strict adjacency, as shown in FIGS. 2A and 3A.

The processor 200 may generate an interpolation pixel at an intermediate position between the position of the first dual-pixel and the position of the second dual-pixel. In some implementations, the intermediate position may be a point equidistant from the position of the first dual-pixel and the position of the second dual-pixel. In other implementations, the intermediate position of an interpolation pixel may be positioned between the first and second dual-pixels but closer towards one of the dual-pixels, and the value of the interpolation pixel may be generated by giving greater weight to the value of the nearer dual-pixel.

In some examples, the processor 200 may determine an average value of the first pixel value and the second pixel value and use the average value as the pixel value corresponding to the interpolation pixel. In other words, the processor 200 may calculate the pixel value of the interpolation pixel by adding the first pixel value to the second pixel value and then dividing the result by 2. Other interpolation techniques, for example weighted averages, may be used.

In some examples, the processor 200 may include an adder configured to perform addition of the first pixel value and the second pixel value, and a shifter configured to perform a division operation by performing a bit-shift operation on an output from the adder.

As noted above, interpolation pixels may be generated for various respective pairings of dual-pixels, and different schemes for pairings may produce different patterns of interpolation pixels. That is, different selections of pairings may correspond to different patterns and/or densities of interpolation pixels in interpolation images. For example, the processor 200 may perform interpolation such that the ratio of a number of interpolation pixels in a horizontal direction of the first interpolation image (or the second interpolation image) to a number of interpolation pixels in a vertical direction of the first image (or the second interpolation image) is the same as the ratio of a number of pixels in a horizontal direction of the image sensor 400 to a number of pixels in a vertical direction of the image sensor 400.

In another example, the processor 200 may perform interpolation such that the ratio of the number of interpolation pixels in the horizontal direction to the number of interpolation pixels in the vertical direction is an integer multiple of a ratio of the number of pixels in the horizontal direction of the image sensor 400 to the number of pixels in the vertical direction of the image sensor 400. In other words, the processor 200 may perform interpolation such that a value obtained by dividing a number of interpolation pixels in the horizontal direction of an interpolation image by a number of interpolation pixels in the vertical direction of the interpolation image is greater than a value obtained by dividing a number of horizontal pixels of an image obtained by the image sensor 400 by a number of vertical pixels of the image. For example, the processor 200 may perform interpolation such that the ratio of the number of interpolation pixels in the horizontal direction to the number of interpolation pixels in the vertical direction is twice the ratio of the number of pixels in the horizontal direction of the image sensor 400 to the number of pixels in the vertical direction of the image sensor 400.

The processor 200 may calculate a disparity based on the first interpolated image and the second interpolated image. A process of calculating the disparity is described with reference to FIGS. 5 and 6. Moreover, the processor 200 may generate a disparity map based on the disparity.

The memory 300 may store data for an operation or an operation result. The memory 300 stores instructions (or programs) executable by the processor 200. For example, the instructions include instructions to perform an operation of the processor 200 and/or an operation of each element of the processor 200.

The memory 300 may be implemented as a volatile memory device or a non-volatile memory device. A volatile memory device may be implemented as dynamic random-access memory (DRAM), static random-access memory (SRAM), thyristor RAM (T-RAM), zero capacitor RAM (Z-RAM), or twin transistor RAM (TTRAM). A non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, a molecular electronic memory device, or insulator resistance change memory.

Figure 2B:
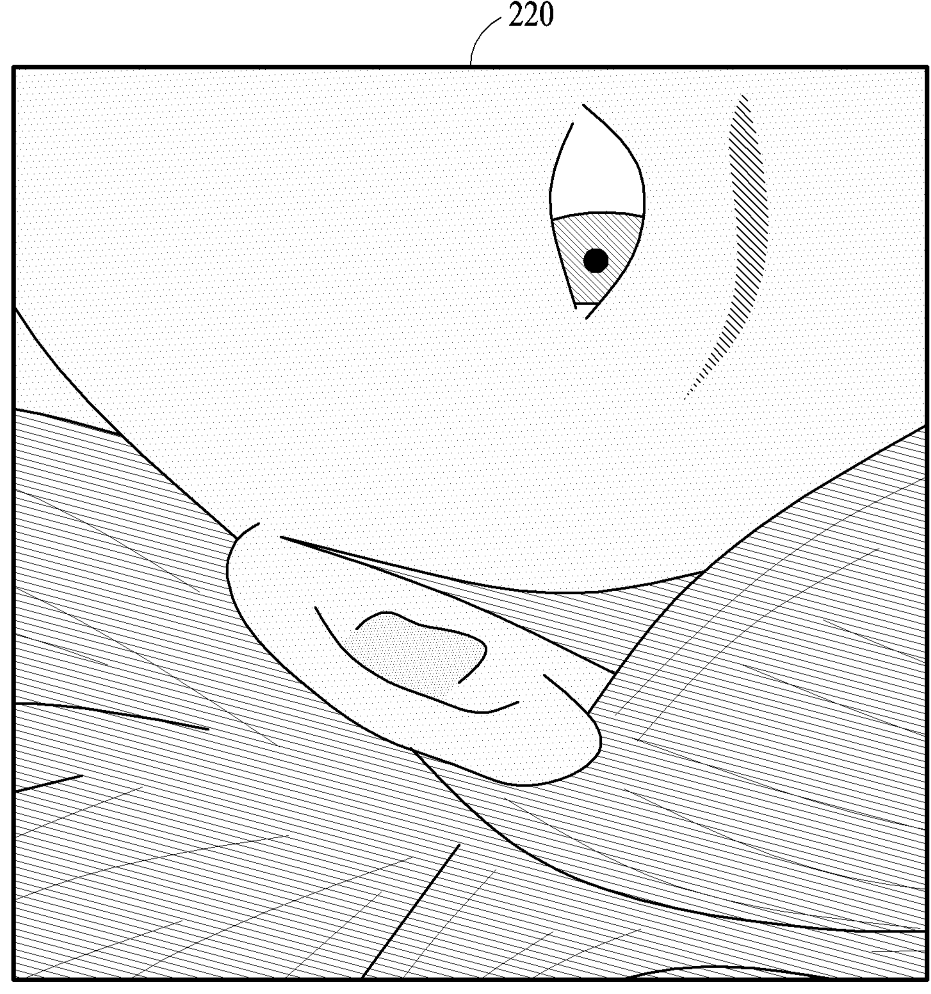
FIG. 2B illustrates an example of an image generated by interpolation operation, according to one or more embodiments.

FIG. 2A illustrates an example of an interpolation operation performed by an image processing apparatus, according to one or more embodiments. For example, the image processing apparatus may be the image processing apparatus of FIG. 1. FIG. 2B illustrates an example of an image generated by the interpolation operation of FIG. 2A.

Referring to FIGS. 2A and 2B, a processor (for example, the processor 200 of FIG. 1) may generate an interpolated image by generating interpolation pixels thereof using interpolation. Such interpolation is described with reference to an interpolation pixel 250, which is representative of the interpolation pixels of an interpolated image. For example, the processor 200 may dispose the interpolation pixel 250 at an intermediate position of two adjacent (or neighboring, or nearby) dual-pixels and may compute a value of the interpolation pixel 250 by averaging pixel values of the two adjacent dual-pixels (e.g., a left value of first dual-pixel 210 and a left value of a second dual-pixel 230).

The processor 200 may generate a first interpolated image and a second interpolated image, based on a position of the first dual-pixel 210 included in a plurality of pixels, a first pixel value obtained by the first dual-pixel 210, a position of the second dual-pixel 230 included in the plurality of pixels, and a second pixel value obtained by the second dual-pixel 230.

The processor 200 may, for example, generate the interpolation pixel 250 at an intermediate position between the position of the first dual-pixel 210 and the position of the second dual-pixel 230. The processor 200 may, for example, determine an average value of the first pixel value and the second pixel value to be a pixel value corresponding to the interpolation pixel 250. For example, if the interpolation pixel 250 is for an interpolated right image, the first pixel value may correspond to a right photodiode of the first dual-pixel 210 and the second pixel value may correspond to a right photodiode of the second dual-pixel 230.

The processor 200 may perform interpolation such that the ratio of a number of interpolation pixels in the horizontal direction and a number of interpolation pixels in the vertical direction is the same as the ratio of a number of pixels disposed in the horizontal direction of an image sensor and a number of pixels disposed in the vertical direction of the image sensor. In other words, the interpolation images may have a same aspect ratio as the image sensor.

The processor 200 may generate the interpolated image with a lattice pattern of interpolation pixels as shown in FIG. 2A and may thereby avoid creating a wave pattern; a wave pattern may not be optimal for some applications of disparity data. The example of FIG. 2B is an interpolated image without a wave-pattern artifact.

For example, raw pixel values of the first image and the second image may be 10 bits, and the pixel values may be stored in a 16-bit container, word, element, etc. The processor 200 may efficiently calculate an average of two pixel values contained in 16 bits by configuring bit-shift for adding the two pixel values and dividing them by 2. The processor 200 may accelerate calculating an interpolated pixel value through a single instruction multiple data (SIMD) operation.

Figure 3B:
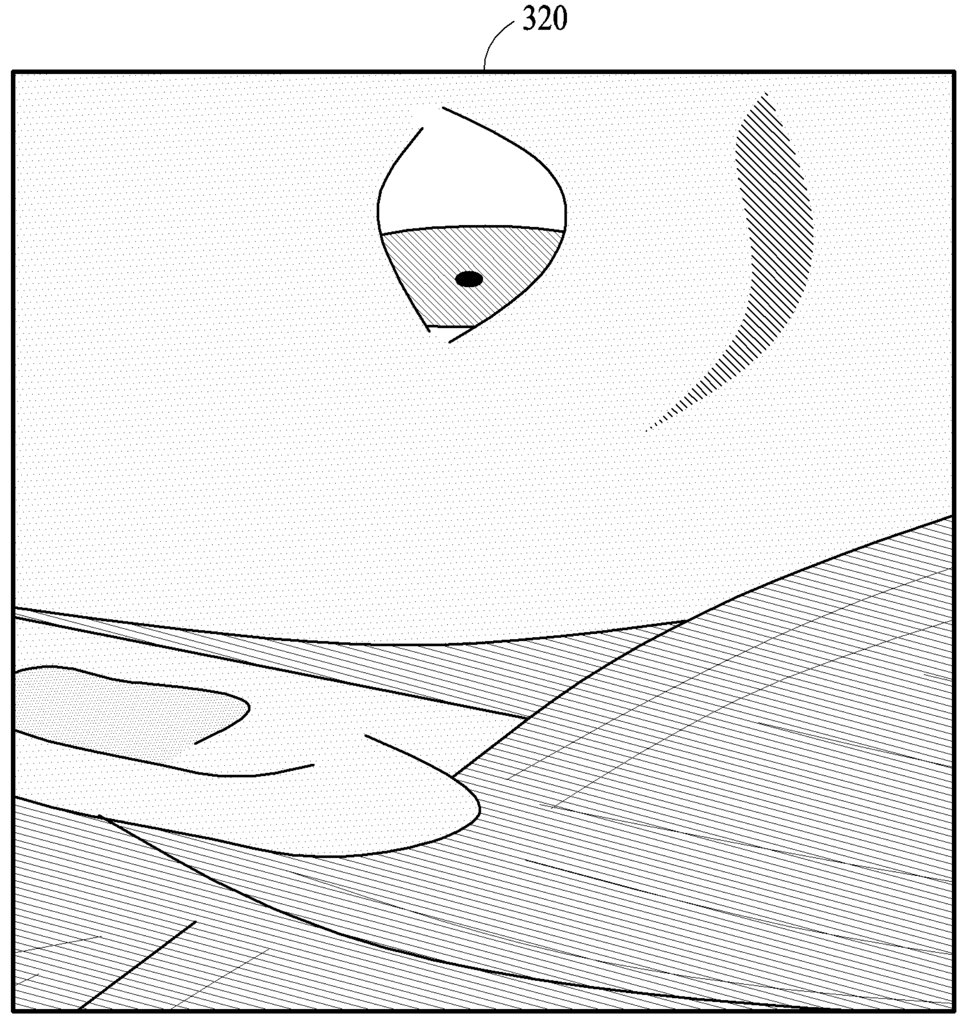
FIG. 3B illustrates an example of an image generated by an interpolation operation, according to one or more embodiments.

FIG. 3A illustrates another example of an interpolation operation performed an image processing apparatus, according to one or more embodiments. The image may be the image processing apparatus of FIG. 1, for example. FIG. 3B illustrates an example of an image generated by the interpolation operation of FIG. 3A.

Referring to FIGS. 3A and 3B, the processor 200 may generate a first interpolation pixel 370 (representing any arbitrary interpolation pixel of the interpolation image) based on (i) a position of a first dual-pixel 310 included in a plurality of pixels, (ii) a first pixel value obtained by the first dual-pixel 310, (iii) a position of a second dual-pixel 330 included in the plurality of pixels, and (iv) a second pixel value obtained by the second dual-pixel 330.

The processor 200 may generate a second interpolation pixel 390 based on (i) the position of the second dual-pixel 330, (ii) the second pixel value of the second dual-pixel 330, (iii) a position of a third dual-pixel 350, and (iv) a third pixel value obtained by the third dual-pixel 350.

The processor 200 may generate the first interpolation pixel 370 at an intermediate position between the position of the first dual-pixel 310 and the position of the second dual-pixel 330. The processor 200 may generate the second interpolation pixel 390 at an intermediate position between the position of the second dual-pixel 330 and the position of the third dual-pixel 350.

The processor 200 may determine an average of the first pixel value and the second pixel value and may set the pixel value of the first interpolation pixel 370 to be that determined average. The processor 200 may determine an average of the second pixel value and the third pixel value and may set the pixel value of the second interpolation pixel 390 to be that determined average.

The processor 200 may perform interpolation for pairs of dual-pixels such that the ratio of the number of interpolation pixels in a horizontal direction of the first/second interpolated image to the number of interpolation pixels in a vertical direction of the first/second image is an integer multiple (e.g., two) of the ratio of the number of pixels in a horizontal direction of an image sensor to the number of pixels in a vertical direction of the image sensor.

The processor 200 may generate a first interpolated image and a second interpolated image by increasing a horizontal resolution of each interpolated image, for example, as shown in FIG. 3A. In case an interpolated image is generated as shown in FIG. 3A, a wave pattern may occur in the horizontal direction but not the vertical direction.

In case interpolation is performed as shown in FIG. 3A and a wave pattern occurs in the horizontal direction of an interpolation image, waviness in the horizontal direction thereof may not be as pronounced as the waviness of the dual-pixels in the horizontal resolution.

FIG. 3B shows an example of an interpolated image generated by performing interpolation as described with reference to FIG. 3A. Since the example interpolation image of FIG. 3B has a higher resolution in the horizontal direction than the interpolation image in the example of FIG. 2B, the processor 200 may obtain a high-resolution disparity map by using the interpolated image shown in FIG. 3B.

Figure 4:
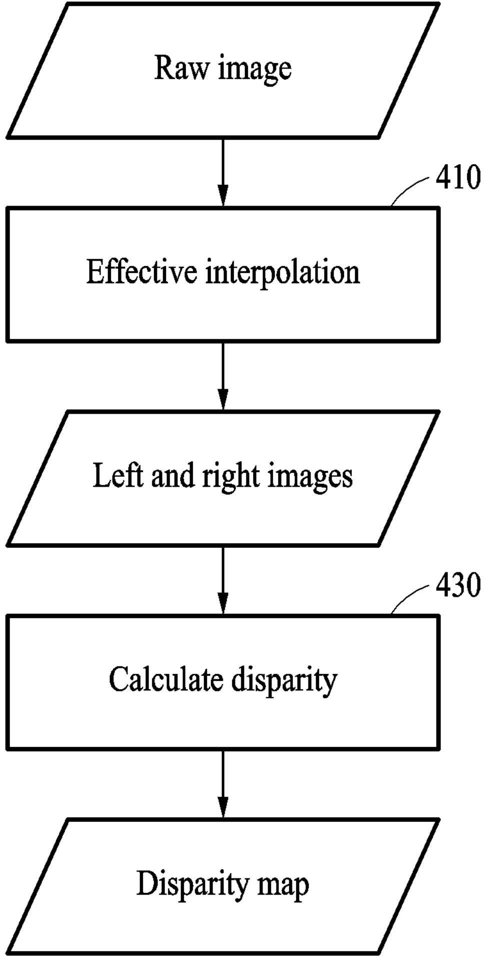
FIG. 4 illustrates an example of an operation of generating a disparity map, according to one or more embodiments.

FIG. 4 illustrates an example of an operation of generating a disparity map, according to one or more embodiments.

Referring to FIG. 4, a processor (for example, the processor 200 of FIG. 1) may generate left and right interpolated images using a raw image obtained by dual-pixels of an image sensor (for example, the image sensor 400 of FIG. 1). The raw image may be an image with left values and right values, for example, of pixels generated by the left and right photodiodes, respectively, of the dual-pixels of the image sensor. In some examples, the raw image may contain both a right image and a left image. In other examples, the left-right values may be provided in separate respective raw left and right images.

The processor 200 may obtain a disparity map (for example, a disparity image or a depth image) by processing the generated left and right interpolated images by using a disparity estimation algorithm. A resolution and quality of the estimated disparity map may vary based on the resolution and quality of the generated left and right interpolated images.

The processor 200 may generate a relatively high-resolution and high-quality disparity map based on a raw image (or images) from a super PD image sensor configured with sparse dual-pixels, by generating the left and right interpolated images through any of the interpolation methods described herein.

The processor 200 may generate relatively high-resolution left and right interpolated images with less likelihood of artifacts by using any of the interpolation methods described herein, and may perform interpolation through, for example, addition and bit-shift of pixel values, for example.

A receiver (for example, the receiver 100 of FIG. 1) may receive a raw image. The raw image may include a first image and a second image (e.g., captured by the image sensor at the same time). The receiver 100 may output the received raw image to the processor 200.

In operation 410, the processor 200 may perform interpolation on the received raw image. The interpolation may be performed, for example, by any of the methods described with reference to FIGS. 2A and 3A.

The processor 200 may generate left and right interpolated images through the interpolation. The left and right interpolated images may correspond to the first interpolated image and the second interpolated image described with reference to FIG. 1, respectively.

In operation 430, the processor 200 may calculate a disparity based on the left and right interpolated images. The processor 200 may then generate a disparity map using the disparity.

Figure 5:
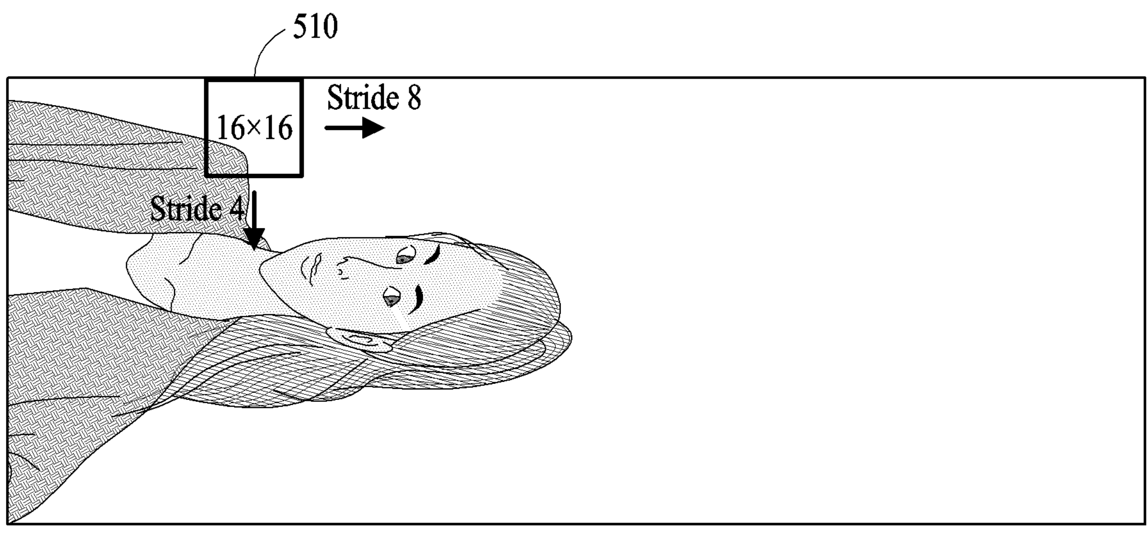
FIG. 5 illustrates an example of a process of generating a disparity, according to one or more embodiments.
Figure 6:
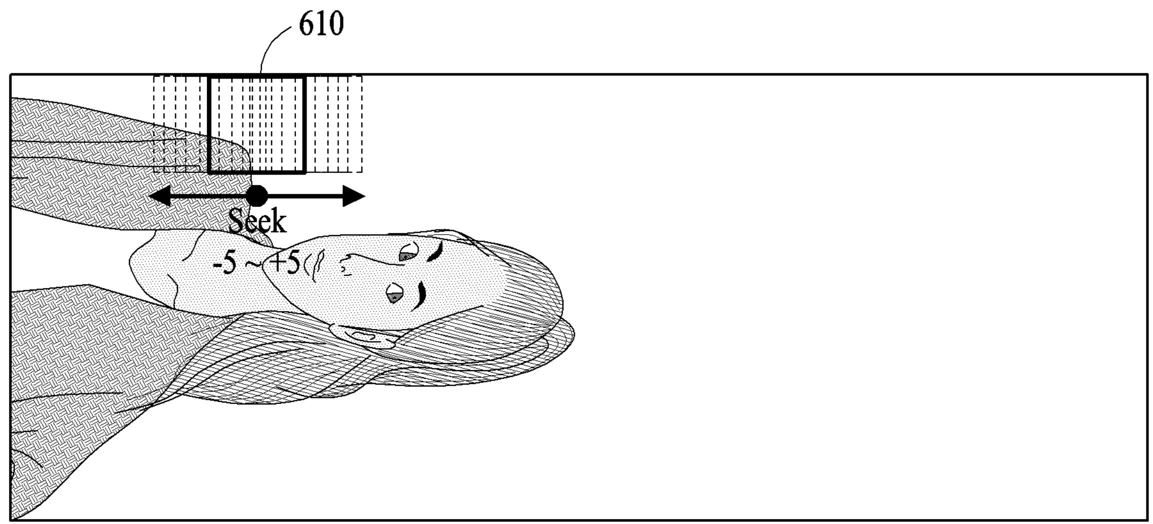
FIG. 6 illustrates an example of a process of generating a disparity, according to one or more embodiments.

FIGS. 5 and 6 illustrate examples of a process of calculating a disparity, according to one or more embodiments. Referring to FIGS. 5 and 6, a processor (for example, the processor 200 of FIG. 1) may calculate a disparity based on a first interpolated image and a second interpolated image. The example of FIG. 5 may represent the first interpolated image, and the example of FIG. 6 may represent the second interpolated image.

The first interpolated image may correspond to a left image, and the second interpolated image may correspond to a right image. The examples of FIGS. 5 and 6 are images interpolated by the method described with reference to FIG. 3A, however, disparity for an image interpolated by the method described with reference to FIG. 2A may be calculated in the same way.

The processor 200 may calculate the disparity using Equations 1 to 7. Equations 1 to 7 are examples of calculating the disparity; the disparity may be calculated by a different method. The processor 200 may calculate a raw disparity based on Equation 1.

Equation 1

$$\underset{(1\sim 11)}{\text{Raw disparity}}\ d_{ij}^{raw} = \underset{idx}{\operatorname{argmin}} SAD\left(\boxed{510},\ \overbrace{\overset{1}{\boxed{610_{-1}}}\ \overset{2}{\boxed{610_{-2}}}\ \cdots\ \overset{2*\text{shift}+1}{\square}}^{idx}\right)$$

Here, 510 denotes a pixel value corresponding to a rectangle 510 of FIG. 5, and 610-1, 610-2, . . . denotes pixel values obtained by seeking a rectangle 610 of FIG. 6 in left and right. "SAD" refers to the sum-of-absolute-differences operation. A seeking shift, a template size, and a stride may be Shift=5, template_size=$(ts_y, ts_x)$=(16, 16), stride=$(st_y, st_x)$=(4, 8).

The processor 200 may calculate textureness based on Equations 2 to 4.

$$\underset{(0\sim 255)}{\text{Textureness}}\ d_{ij}^{text} = \text{MapTo8bit}\left(\sum \left| Sobel_{x-dir}\left(\boxed{510}\right)\right|\right) \quad \text{Equation 2}$$

$$MapTo8bit = \text{CLIP}(\text{SHIFT}_{right}(\cdot, div_{shift}), 0, 255) \quad \text{Equation 3}$$

$$div_{shift} = \log_2(ts_y \cdot ts_x) - 4 \quad \text{Equation 4}$$

The processor 200 may calculate a texture map based on Equations 5 and 6.

$$\underset{(0,1)}{\text{Texture map}} \; d_{ij}^{tmap} = d_{ij}^{text} > Th_{texture} \quad \text{Equation 5}$$

Here, $Th_{texture}$ may be calculated by Equation 6.

$$Th_{texture} = INT\left(1.1 \cdot \left(\frac{ts_y \cdot ts_x}{2^{shift}}\right)\right) \quad \text{Equation 6}$$

The processor 200 may calculate the disparity based on the raw disparity and the texture map, as shown in Equation 7.

$$\underset{(0\sim11)}{Conf.\ \text{disparity}} \; d_{ij}^{conf} = d_{ij}^{raw} \cdot d_{ij}^{tmap} \quad \text{Equation 7}$$

Figure 7:
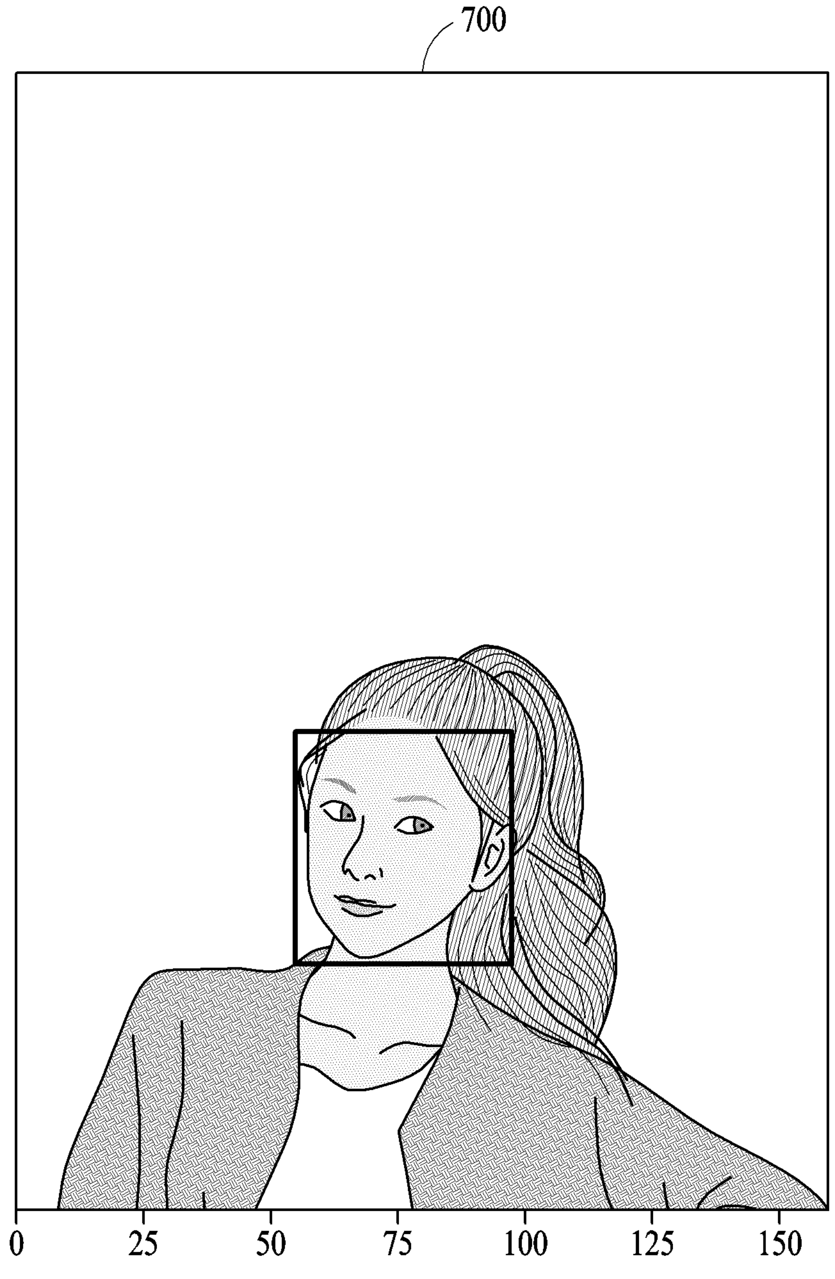
FIG. 7 illustrates an example of a grayscale image before performing image processing, according to one or more embodiments.
Figure 8:
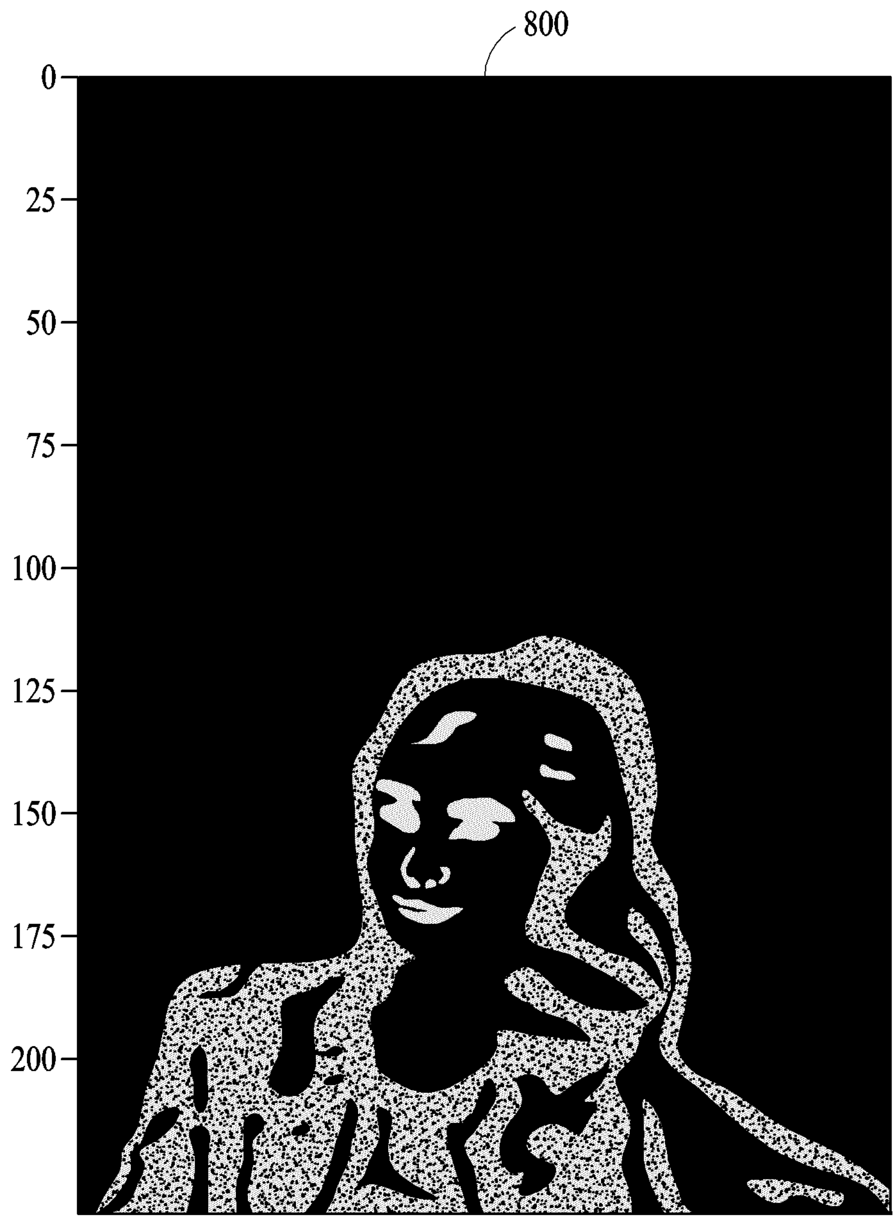
FIG. 8 illustrates an example of a disparity map generated by an interpolation operation, according to one or more embodiments.
Figure 9:
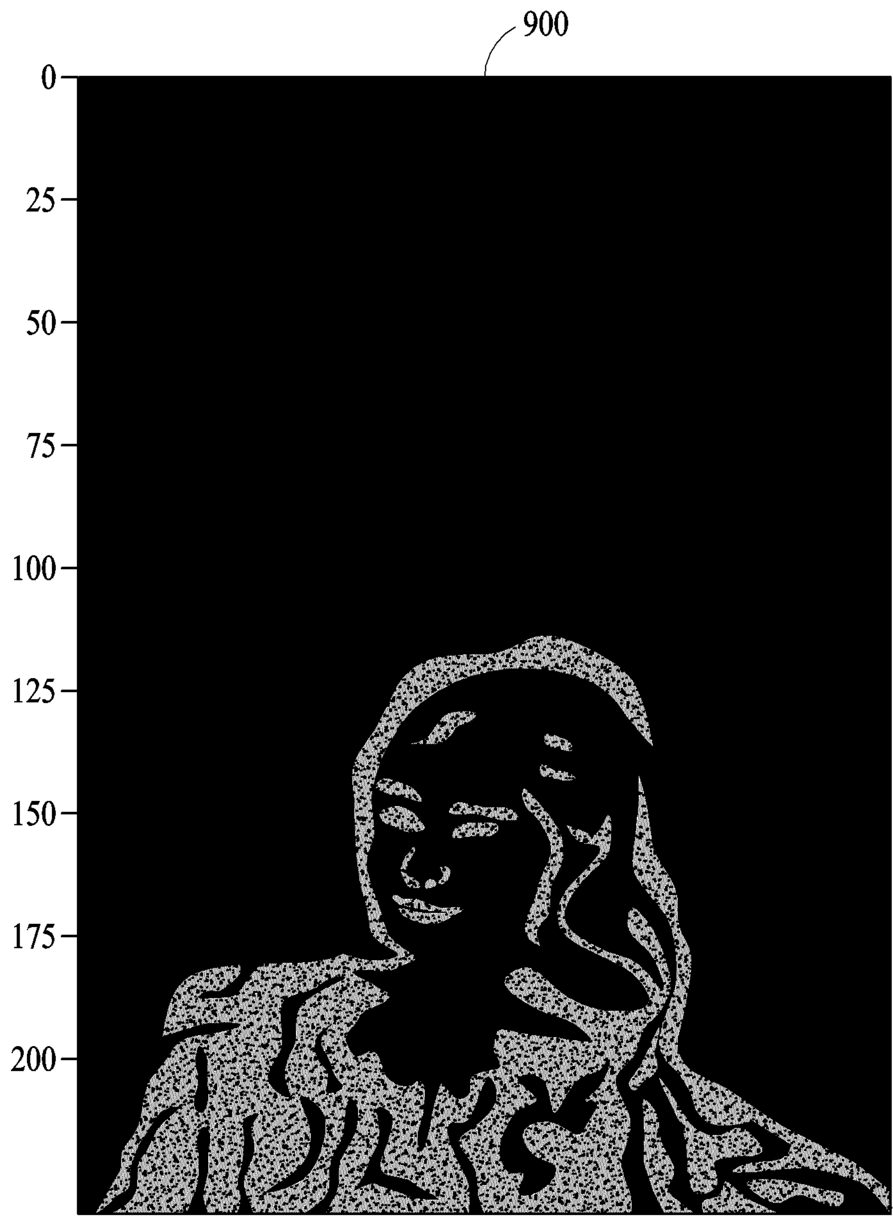
FIG. 9 illustrates an example of a disparity map generated by an interpolation operation, according to one or more embodiments.

FIG. 7 illustrates an example of a grayscale image 700 before performing image processing, FIG. 8 illustrates an example of a disparity map 800 generated by the interpolation operation of FIG. 3A, and FIG. 9 illustrates an example of a disparity map 900 generated by the interpolation operation of FIG. 2B.

Referring to FIGS. 7 to 9, a processor (for example, the processor 200 of FIG. 1) may generate relatively high-resolution left and right interpolated images without minimal artifacts by using sparsely distributed dual-pixels as in the example of a super PD image sensor.

The processor 200 may perform interpolation by using an interpolation pattern method considering a dual-pixel distribution pattern of a super PD image sensor and may perform interpolation through an addition operation and a bit-shift operation. Through this process, the processor 200 may obtain a detailed disparity map with reduced noise.

The processor 200 may generate left and right interpolated images (for example, a first interpolated image and a second interpolated image) by processing raw data obtained by a super PD image sensor and may calculate a disparity from the generated interpolated images.

A conventional method may generate left and right images by, for example, using pixel reordering, however, this may degrade a resolution or may cause artifacts, and the quality of an estimated disparity may be degraded due to the artifacts. However, the processor 200 may improve a resolution and accuracy of a disparity map by generating an interpolated image using an interpolation method.

Figure 10:
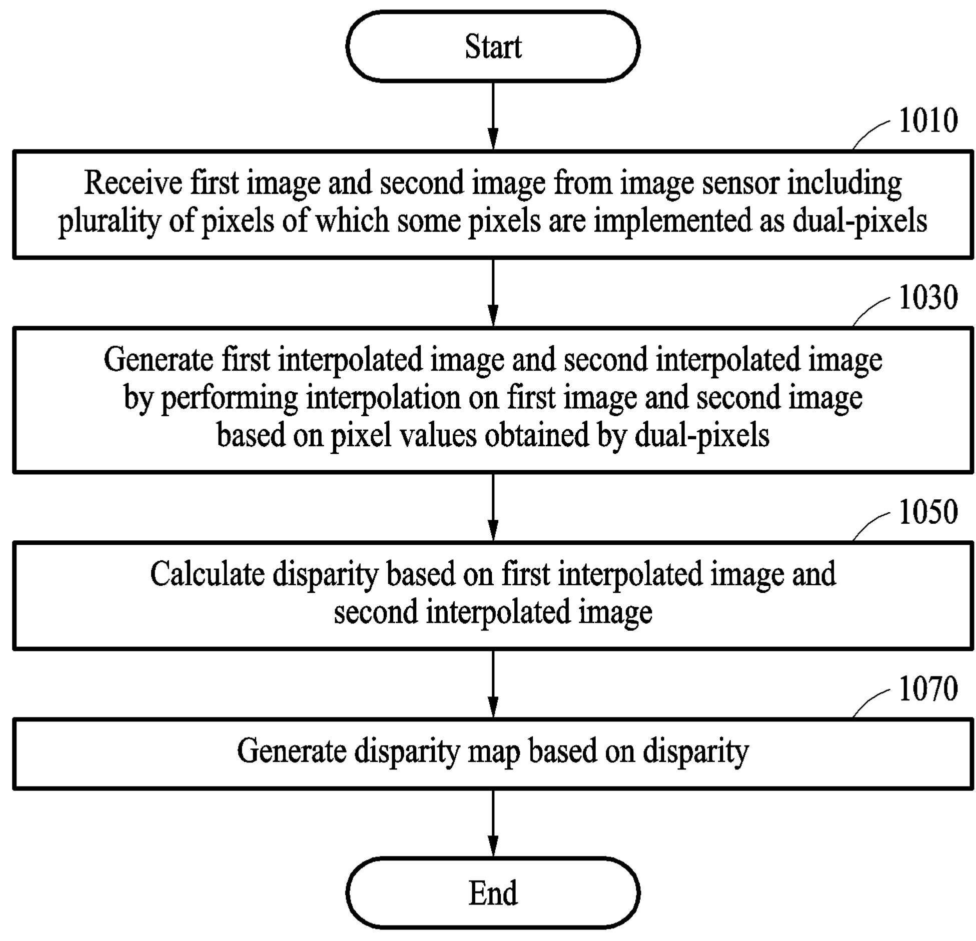
FIG. 10 illustrates an example of an operation of an image processing apparatus, according to one or more embodiments.

FIG. 10 illustrates an example of an operation of an image processing apparatus, according to one or more embodiments. The image processing apparatus may be the image processing apparatus of FIG. 1. Referring to FIG. 10, in operation 1010, a receiver (for example, the receiver 100 of FIG. 1) may receive a first image and a second image from an image sensor (for example, the image sensor 400 of FIG. 1) that includes a plurality of pixels of which some pixels are configured as dual-pixels and some are configured as ordinary non-dual-pixels (e.g., color-sensing pixels).

In operation 1030, the processor 200 may generate a first interpolated image and a second interpolated image by performing interpolation on the first image and the second image, respectively, based on pixel values obtained by the dual-pixels.

The processor 200 may generate the first interpolated image and the second interpolated image based on a position of a first dual-pixel included in the plurality of pixels, a first pixel value obtained by the first dual-pixel, a position of a second dual-pixel included in the plurality of pixels, and a second pixel value obtained by the second dual-pixel.

The processor 200 may represent the first pixel value and the second pixel value by using a 16-bit container, word, etc.

The processor 200 may generate an interpolation pixel at an intermediate position between the position of the first dual-pixel and the position of the second dual-pixel.

The processor 200 may determine an average of the first pixel value and the second pixel value and set a pixel value of the corresponding interpolation pixel to the average.

The processor 200 may include an adder configured to perform addition of the first pixel value and the second pixel value, and a shifter configured to perform a division operation by performing a bit-shift operation on an output from the adder.

The processor 200 may perform interpolation such that the ratio of the number of interpolation pixels in a horizontal direction of the first image and of the second image and the number of interpolation pixels in a vertical direction of the first image and of the second image is the same as (or an integer multiple of) the ratio of the number of pixels disposed in a horizontal direction of the image sensor 400 and the number of pixels disposed in a vertical direction of the image sensor 400.

In operation 1050, the processor 200 may calculate a disparity based on the first interpolated image and the second interpolated image.

In operation 1070, the processor 200 may generate a disparity map based on the disparity.

The computing apparatuses, the vehicles, the electronic devices, the processors, the memories, the image sensors, the vehicle/operation function hardware, the displays, the information output system and hardware, the storage devices, and other apparatuses, devices, units, modules, and components described herein with respect to FIGS. 1-10 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-10 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An apparatus comprising:

a processor configured to:

generate a first interpolated image by performing interpolation on a first image and generate a second interpolated image by performing interpolation on a second image, wherein the first image and the second image comprise pixel values obtained by dual-pixels of an image sensor; and generate a disparity map based on the first interpolated image and the second interpolated image, wherein the processor is further configured to perform interpolation such that a ratio of a number of interpolation pixels in a horizontal direction to a number of interpolation pixels in a vertical direction is an integer multiple of a ratio of a number of pixels in a horizontal direction of the image sensor to a number of pixels in a vertical direction of the image sensor, where the integer multiple is at least 2.

2. The apparatus of claim 1, wherein the first image is a left image, and the second image is a right image.

3. The apparatus of claim 1, wherein the processor is further configured to generate the first interpolated image based on a position of a first dual-pixel of the dual-pixels, a first pixel value obtained by the first dual-pixel, a position of a second dual-pixel of the dual-pixels, and a second pixel value obtained by the second dual-pixel.

4. The apparatus of claim 3, wherein the processor is configured to generate the second interpolated image based on the position of the first dual-pixel, a third pixel value obtained by the first dual-pixel, the position of the second dual-pixel, and a fourth pixel value obtained by the second dual-pixel.

5. The apparatus of claim 3, wherein each of the dual-pixels respectively comprises a first photodiode, a second photodiode, and a single lens configured to refract light to the first photodiode and the second photodiode.

6. The apparatus of claim 5, wherein the first pixel value is obtained by the first photodiode of the first dual-pixel, the second pixel value is obtained by the first photodiode of the second dual-pixel, the third pixel value is obtained by the second photodiode of the first dual-pixel, and the fourth pixel value is obtained by the second photodiode of the second dual-pixel.

7. The apparatus of claim 5, wherein the apparatus comprises the image sensor.

8. The apparatus of claim 4, wherein the processor is further configured to generate an interpolation pixel at an intermediate position between the position of the first dual-pixel and the position of the second dual-pixel.

9. The apparatus of claim 8, wherein the processor is further configured to determine an average of the first pixel value and the second pixel value and to set a pixel value of the interpolation pixel to the average.

10. The apparatus of claim 4, wherein the processor comprises:

an adder configured to perform addition of the first pixel value and the second pixel value; and a shifter configured to perform a division operation by performing a bit-shift operation on a result of the addition that is outputted from the adder.

11. The apparatus of claim 1, wherein the apparatus comprises a smartphone.

12. A processor-implemented method comprising:

accessing a first image and a second image, the first image and the second image generated by an image sensor comprising pixels that include dual-pixels and that include pixels that are not dual-pixels, wherein each dual-pixel respectively comprises a first photodiode, a second photodiode, and a single lens, wherein the first image comprises pixel values obtained from the first photodiodes and wherein the second image comprises pixel values obtained from the second photodiodes;

generating a first interpolated image by generating first interpolated pixels based on interpolation of the pixel values in the first image, and generating a second interpolated image by generating second interpolated pixels based on interpolation of the pixel values in the second image; and generating a disparity map based on the first interpolated image and the second interpolated image, wherein the processor is further configured to perform interpolation such that a ratio of a number of interpolation pixels in a horizontal direction to a number of interpolation pixels in a vertical direction is an integer multiple of a ratio of a number of pixels in a horizontal direction of the image sensor to a number of pixels in a vertical direction of the image sensor, where the multiple is the integer is at least 2.

13. The method of claim 12, wherein the first image is a left image, and the second image is a right image, and wherein the first image and the second image are captured by the image sensor at the same time.

14. The method of claim 12, wherein the first interpolated pixels are positioned in the first interpolated image based on positions of respective pairs of pixels in the first image, and wherein the second interpolated pixels are positioned in the second interpolated image based on positions of respective pairs of pixels in the second image.

15. The method of claim 14, wherein the pairs of pixels correspond to pairs of the dual-pixels of the image sensor.

16. The method of claim 15, wherein each pixel of the first interpolated image has a position therein that corresponds to a position between the pixels of a corresponding pair of pixels of the first image.

17. The method of claim 14, wherein the first interpolated pixels comprise respective averages of the pixel values in the first image.

18. The method of claim 14, wherein the generating of the first and second interpolated pixels comprises:

performing, by an adder, additions of the pixel values in the first image and additions of the pixel values in the second image; and performing, by a shifter, bit-shift operations on results of the additions outputted from the adder.

19. The method of claim 14, wherein the generating of the first interpolated image and the second interpolated image comprises performing interpolation such that a number of pixels in a horizontal direction in each of the first image and the second image is the same as a number of pixels in a vertical direction in each of the first image and the second image.

20. The method of claim 14, wherein the generating of the first interpolated image and the second interpolated image comprises performing interpolation such that an image aspect ratio of each of the first image and the second image is the same as, or a multiple of, an image aspect ratio of the image sensor.

21. A non-transitory computer-readable storage medium storing instructions that, when executed by a processor, cause the processor to perform the method of claim 12.

22. A method comprising:

accessing a first image comprising first pixels, wherein each first pixel comprises a first value, wherein the first image is generated by an image sensor comprising pixels, wherein the pixels of the image sensor comprise dual-pixels and non-dual-pixels, each dual-pixel respectively comprising first and second photodiodes, wherein the first values are provided by the respective first photodiodes; and generating a first interpolated image by interpolating pairs of first photodiodes of different dual-pixels, wherein the processor is further configured to perform interpolation such that a ratio of a number of interpolation pixels in a horizontal direction to a number of interpolation pixels in a vertical direction is an integer multiple of a ratio of a number of pixels in a horizontal direction of the image sensor to a number of pixels in a vertical direction of the image sensor, where the integer multiple is at least 2.

23. The method of claim 22, wherein each first photodiode has a different point spread function than its corresponding second photodiode.

24. The method of claim 22, wherein the first photodiodes are left photodiodes and the second photodiodes are right photodiodes.

25. The method of claim 22, wherein each dual-pixel further comprises a lens configured to refract light to the corresponding first and second photodiodes.

26. The method of claim 24, further comprising:

accessing a second image comprising second pixels, wherein each second pixel comprises a second value, wherein the second image is generated by the image sensor concurrently with the first image, and wherein the second values are provided by the respective second photodiodes; and generating a second interpolated image by interpolating pairs of the second pixels.

27. The method of claim 26, further comprising generating a disparity map based on the first interpolated image and the second interpolated image.

28. The method of claim 27, further comprising autofocusing a camera based on the disparity map.

29. The apparatus of claim 1, wherein the processor comprises:

an adder configured to perform addition of the first pixel value and the second pixel value; and a shifter configured to perform a division operation by performing a bit-shift operation on a result of the addition that is outputted from the adder, wherein each of the first image and second image comprises an initial value represented by a first number of bits, and wherein the initial value, after storage, is represented by a second number of bits higher than the first number of bits as the respective first and second pixel values.

30. The method of claim 22, wherein the dual-pixels comprise an initial value represented by a first number of bits, and wherein the initial value, after storage, is represented by a second number of bits higher than the first number of bits as the respective first values, wherein the processor is further configured to perform addition of the first values via an adder; and perform a division operation by performing a bit-shift operation on a result of the addition that is outputted from the adder.

* * * * *